(12) United States Patent
Murakami et al.

(10) Patent No.: US 12,492,331 B2
(45) Date of Patent: Dec. 9, 2025

(54) COMPOSITE MATERIAL INCLUDING COF, HEAT DISSIPATION/STORAGE MEMBER, AND METHOD FOR PRODUCING SAID COMPOSITE MATERIAL, AND COF SINGLE CRYSTAL AND PRODUCTION METHOD THEREFOR

(71) Applicant: Japan Science and Technology Agency, Kawaguchi (JP)

(72) Inventors: Yoichi Murakami, Tokyo (JP); Yukitaka Kato, Tokyo (JP); Hiroki Takasu, Tokyo (JP); Xiaohan Wang, Tokyo (JP)

(73) Assignee: Japan Science and Technology Agency, Kawaguchi (JP)

( * ) Notice: Subject to any disclaimer, the term of this patent is extended or adjusted under 35 U.S.C. 154(b) by 150 days.

(21) Appl. No.: 17/796,026

(22) PCT Filed: Jan. 28, 2021

(86) PCT No.: PCT/JP2021/003090
§ 371 (c)(1),
(2) Date: Jul. 28, 2022

(87) PCT Pub. No.: WO2021/153689
PCT Pub. Date: Aug. 5, 2021

(65) Prior Publication Data
US 2023/0095617 A1 Mar. 30, 2023

(30) Foreign Application Priority Data
Jan. 29, 2020 (JP) .................................. 2020-012455

(51) Int. Cl.
*C09K 5/16* (2006.01)
*B01J 20/28* (2006.01)
(Continued)

(52) U.S. Cl.
CPC .................. *C09K 5/16* (2013.01); *B01J 20/28* (2013.01); *F28D 20/003* (2013.01); *F28D 20/02* (2013.01); *F28D 2020/0008* (2013.01)

(58) Field of Classification Search
CPC ....... C09K 5/16; C07C 211/53; C07C 47/544; B01J 20/24; B01J 20/28; B01J 20/30;
(Continued)

(56) References Cited

U.S. PATENT DOCUMENTS

| | | |
|---|---|---|
| 2006/0154807 A1 | 7/2006 | Yaghi et al. |
| 2014/0081014 A1 | 3/2014 | Yaghi et al. |

(Continued)

FOREIGN PATENT DOCUMENTS

| | | |
|---|---|---|
| CN | 108117526 * | 6/2018 |
| CN | 109317206 A | 2/2019 |

(Continued)

OTHER PUBLICATIONS

Ma et al. "Single-crystal x-ray diffraction structures of covalent organic frameworks" (Year: 2018).*

(Continued)

*Primary Examiner* — Andrew D Kosar
*Assistant Examiner* — Blaine G Doletski
(74) *Attorney, Agent, or Firm* — The Webb Law Firm

(57) ABSTRACT

A composite material including a covalent organic framework (COF) single crystal having a major axis length of larger than 120 μm or a COF polycrystal including a plurality of the single crystals, and at least one heat-storage compound. The heat-storage compound is a compound that generates heat or absorbs heat by adsorption to or desorption from the COF single crystal. Also, a heat dissipation/storage member containing the composite material as a heat storage/dissipation material a COF single crystal having a major axis length of larger than 120 μm, and a method for producing a (Continued)

COF single crystal by crystallizing COF raw material compounds via a solution containing an ionic liquid or an organic salt and an equilibrium adjusting agent to grow a COF single crystal.

10 Claims, 8 Drawing Sheets

(51) Int. Cl.
   *F28D 20/00* (2006.01)
   *F28D 20/02* (2006.01)
(58) Field of Classification Search
   CPC .................. F28D 20/003; F28D 20/02; F28D 2020/0008; F28D 2020/0017; G06Q 40/08; G06Q 50/40; G07C 5/02; Y02E 60/14
   See application file for complete search history.

(56) References Cited

U.S. PATENT DOCUMENTS

| | | | |
|---|---|---|---|
| 2014/0148596 A1 | 5/2014 | Dichtel et al. | |
| 2016/0334145 A1 | 11/2016 | Pahwa et al. | |
| 2018/0319821 A1 | 11/2018 | Yaghi et al. | |

FOREIGN PATENT DOCUMENTS

| | | | |
|---|---|---|---|
| JP | H06213529 A | 8/1994 | |
| JP | 2008518054 A | 5/2008 | |
| JP | 201387276 A | 5/2013 | |
| JP | 2013540760 A | 11/2013 | |
| JP | 2018518356 A | 7/2018 | |
| JP | 2019503407 A | 2/2019 | |
| WO | 2016174468 A1 | 11/2016 | |

OTHER PUBLICATIONS

Han et al. (Fast Growth of Single-Crystal Covalent Organic Framework for Laboratory x-Ray Diffraction, Science 383, pp. 1014-1019, Published 2024) (Year: 2024).*
Ma et al. 2020 (Diverse Crystal Size Effects in Covalent Organic Frameworks, Nature Communications, pp. 1-9, Published 2020) (Year: 2020).*
Shang et al. (Large organic single crystal sheets grown from the gas-liquid and gas-liquid-solid interface, CrstEngComm., 14, pp. 869-874, Published 2012). (Year: 2012).*
Mekala et al. (Crystal growth and physical properties of the organic salt benzimidazolium 3-nitrophalate, CrstEngComm., 18, pp. 8194-8206, Published 2016) (Year: 2016).*
Wang et al. (Ionic additive strategy to control nucleation and generate larger single crystals of 3D covalent organic frameworks, ChemCom Royal Society of Chemistry, 57, pp. 6656-6659, published 2021). (Year: 2021).*
CN108117526 translation (Year: 2018).*
Ma et al. (Single-crystal x-ray diffraction structures of covalent organic frameworks, Science 361, pp. 48-52, Published 2018) (Year: 2018).*
Ma et al. supplemental information (pp. 1-71, Published 2018) (Year: 2018).*
Fraile et al. (Enantioselective cyclopropanation reactions in ionic liquids, Tetrahedron: Asymmetry, 12, pp. 1891-1894, Published 2001 (Year: 2001).*
Geng et al. (Covalent Organic Frameworks: Design, Synthesis, and Functions, Chemical Reviews vol. 120/Issue 16, pp. 8814 to 8933, Published Jan. 22, 2020) (Year: 2020).*
Freitas, Sunny K.S. et al., Thermal Conductivity of Covalent Organic Frameworks as a Function of Their Pore Size, The Journal of Physical Chemistry, 2017, pp. 27247-27252, vol. 121, ACS Publications.
Guan, Xinyu et al., Fast, Ambient Temperature and Pressure Ionothermal Synthesis of Three-Dimensional Covalent Organic Frameworks, Journal of the American Chemical Society, 2018, pp. 4494-4498, vol. 140, ACS Publications.
Ma, Tianqiong et al., Single-crystal x-ray diffraction structures of covalent organic frameworks, Science, 2018, pp. 48-52, vol. 361, American Association for the Advancement of Science.

* cited by examiner

COMPOSITE MATERIAL INCLUDING COF, HEAT DISSIPATION/STORAGE MEMBER, AND METHOD FOR PRODUCING SAID COMPOSITE MATERIAL, AND COF SINGLE CRYSTAL AND PRODUCTION METHOD THEREFOR

CROSS-REFERENCE TO RELATED APPLICATIONS

This application is the United States national phase of International Application No. PCT/JP2021/003090 filed Jan. 28, 2021, and claims priority to Japanese Patent Application No. 2020-012455 filed Jan. 29, 2020, the disclosures of which are hereby incorporated by reference in their entirety.

BACKGROUND OF THE INVENTION

Field of the Invention

The present invention relates to a composite material including a covalent organic framework (hereinafter, abbreviated as "COF"), a heat dissipation/storage member, and a method for producing the composite material. In addition, the present invention relates to a COF single crystal and a method for producing the COF single crystal.

Description of Related Art

A heat storage/dissipation system using reaction heat or latent heat has been proposed. As an example, a system using a hydration reaction of magnesium oxide is mentioned. In a heat storage mode of this system, magnesium hydroxide is heated by heat to obtain magnesium oxide and water. On the other hand, in a heat dissipation mode, magnesium oxide and water are subjected to a hydration reaction to output reaction heat (JP H6-213529 A).

As another example, a system using solid-liquid phase transition of sodium acetate trihydrate is mentioned. Sodium acetate trihydrate has a melting point (solidification point) close to 57.5° C. and can store heat as heat of fusion and dissipate heat as heat of solidification (JP 2013-87276 A).

Meanwhile, in 2005, Prof. Yaghi et al. of University of California, Berkeley announced a porous material called a COF, in which light atoms such as hydrogen, boron, carbon, oxygen, and nitrogen are covalently linked to form a network structure. The COF is a framework structure material formed by covalently bonding a plurality of kinds of building unit molecules (hereinafter, also referred to as "raw material compounds") including a "main body portion (linker)" as a basic skeleton and a "hand portion (linkage)" as a bonding group for connecting linkers to each other, by polycondensation. The COF is characterized by having a microscopic periodic order, a well-defined structure, a high specific area, and a uniform pore diameter.

The COF has various advantages such as a low environmental load since it is composed only of light elements such as H, C, N, O, B, and Si, high thermal and chemical stability since it is formed by a covalent bond, and possibility of design of a structure and a function expression in a form that can be expected by selection of a linker and a linkage. The COF is determined to be a two-dimensional COF or a three-dimensional COF depending on the number and direction of linkages of building unit molecules, the two-dimensional COF has a planar laminated structure, and the three-dimensional COF has a three-dimensional steric structure.

The COF can freely design a uniform pore diameter by appropriately selecting a linker and a linkage. Since the COF has a network structure formed by covalent bonds, the COF is considered to be chemically more stable than a metal-organic framework (MOF) that is a network structure formed by coordination bonds of metals, and is expected to be used as gas storage, separation, a catalyst, and the like (JP 2008-518054 A).

As described above, the COF is expected to be used in various use applications, but the thermal conductivity is not paid much attention. According to very few reports, for example, there is a report that the thermal conductivity of a powder or the like including fine single crystals of COF-300 that is one kind of COFs is 0.038 to 0.048 W/mK, and the thermal conductivity is inversely proportional to the cross-sectional area of pores of the COF (S. K. S. Freitas, et al., "Thermal Conductivity of Covalent Organic Frameworks as a Function of Their Pore Size", J. Phys. Chem. C 2017, 121, 27247-27252). This thermal conductivity value is be equal to that of cotton or the like, and is smaller by one digit than a resin such as polypropylene, by two digits than that of soda glass, by three digits than that of SUS, and by four digits than that of aluminum. That is, the COF has been considered as a material having a low thermal conductivity.

The COF is a crystal showing a peak in X-ray diffraction, but a single crystal of several tens of μm or more has not been known until recent years, and only a powder including fine single crystals has been known. However, in recent years, it has been reported that a single crystal having a size of about 60 to 100 μm was produced for COF-300 or the like by a production method using aniline or the like as an equilibrium adjusting agent (Ma et al., "Single-crystal x-ray diffraction structures of covalent organic frameworks", Science 361, 48-52 (2018)). This literature describes that it takes 30 to 40 days to produce a single crystal having a size exceeding 100 μm.

In the production of a COF constituted by an imine bond between a raw material compound having an amino group as a linkage and a raw material compound having a formyl group as a linkage, it is necessary to form an imine bond between the raw material compounds by an acid catalyst. At this time, a report has been made in which nanocrystals of COFs (3D-IL-COF-1) similar to COF-300 were synthesized at room temperature using an ionic liquid serving as both a solvent and an acid catalyst in place of a combination of a conventional organic solvent and an acid catalyst (X. Guan et al. "Fast, Ambient Temperature and Pressure Ionothermal Synthesis of Three-Dimensional Covalent Organic Frameworks" J. Am. Chem. Soc. 140, 4494 (2018)). This literature describes that tetrakis(4-formylphenyl)-methane (TFPM) and p-phenylenediamine (PDA) were used as raw material compounds, and [BMIm][NTf$_2$] (BMIm=1-butyl-3-methyl-imidazolium, NTf$_2$=bis(tetrafluoromethylsulfonyl)imide was used as an ionic liquid. As a result, the crystallinity was improved as compared with the case of not using an ionic liquid, but the crystal size was less than 1 μm.

CITATION LIST

Patent Literature

Patent Literature 1: JP H6-213529 A
Patent Literature 2: JP 2013-87276 A
Patent Literature 3: JP 2008-518054 A Non Patent Literature Non Patent Literature 1: S. K. S. Freitas, et al., "Thermal Conductivity of Covalent Organic Frameworks as a Function of Their Pore Size", J. Phys. Chem. C 2017, 121, 27247-27252

Non Patent Literature 2: Ma et al., "Single-crystal x-ray diffraction structures of covalent organic frameworks", Science 361, 48-52 (2018)

Non Patent Literature 3: X. Guan et al. "Fast, Ambient Temperature and Pressure Ionothermal Synthesis of Three-Dimensional Covalent Organic Frameworks" J. Am. Chem. Soc. 140, 4494 (2018)

SUMMARY OF INVENTION

An existing heat storage/dissipation system has a problem in that a heat storage/dissipation rate is low. That is, magnesium oxide, sodium acetate trihydrate, and the like that are heat storage/dissipation materials have a low thermal conductivity. Therefore, it takes time for the generated heat and the absorbed heat to diffuse from the surface. On the other hand, it has not been reported so far to use the COF as a heat storage/dissipation material. It has been reported that a COF having a stable network structure has a low thermal conductivity as described below, and thus it has not been considered so far to use the COF as a heat storage/dissipation material.

It has been reported that the COF having a stable network structure has a low thermal conductivity as described above, but the present inventors have conceived that the report of the low thermal conductivity described above is caused by point contact between grains and crystal grain boundaries due to the fact that a measurement sample is an aggregate of fine single crystals, that is, a powder, and in the case of using a structure without point contact or grain boundaries in a direction in which heat flows, for example, a single crystal, a high thermal conductivity may be exhibited in the single crystal. However, a conventionally known COF single crystal has a grain size (major axis length) of less than 100 μm, and this size generally belongs to a micro scale from the viewpoint of engineering applications, which is an obstacle to the realization of the above idea.

An object of the present invention is to provide a COF single crystal that is suitable for engineering applications, has excellent heat transportability, and has a larger grain size than before, and a method for producing the COF single crystal. Another object of the present invention is to provide a composite material that uses such a COF single crystal so as to have excellent heat dissipation/storage characteristics, and a heat dissipation/storage member containing the composite material and a method for producing the composite material.

The inventors have found that a larger COF single crystal than before can be produced by using a solution simultaneously containing an equilibrium adjusting agent and an ionic liquid in the synthesis of the COF. The present inventors have considered that both high thermal conductivity and a high heat storage/heat dissipation amount can be achieved by compositing a thermal conduction path obtained by the network structure of such a large COF single crystal and a compound storing and dissipating heat, thereby completing the invention of the present application.

[1]: A composite material including a covalent organic framework (COF) single crystal having a major axis length of larger than 120 μm or a COF polycrystal including a plurality of the single crystals, and at least one heat-storage compound, the heat-storage compound being a compound that generates heat or absorbs heat by adsorption to or desorption from the COF single crystal, or a phase change or a chemical reaction occurring within a range of −20 to 200° C.

[2]: The composite material described in [1], in which the adsorption or desorption, the phase change, and the chemical reaction are reversible.

[3]: The composite material described in [1], in which the covalent organic framework (COF) has a framework structure including (a) a linker selected from the group consisting of Formulas (I) to (VII) below,

[Chemical Formula 1]

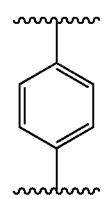

I

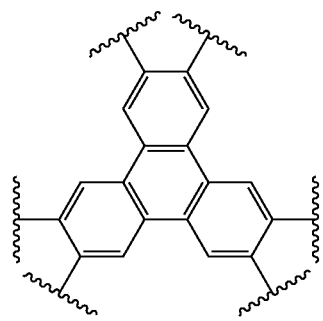

II

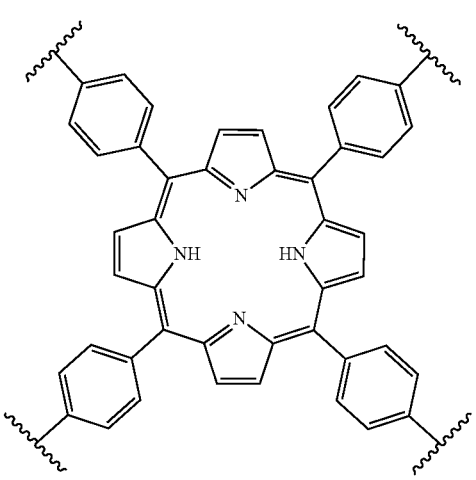

III

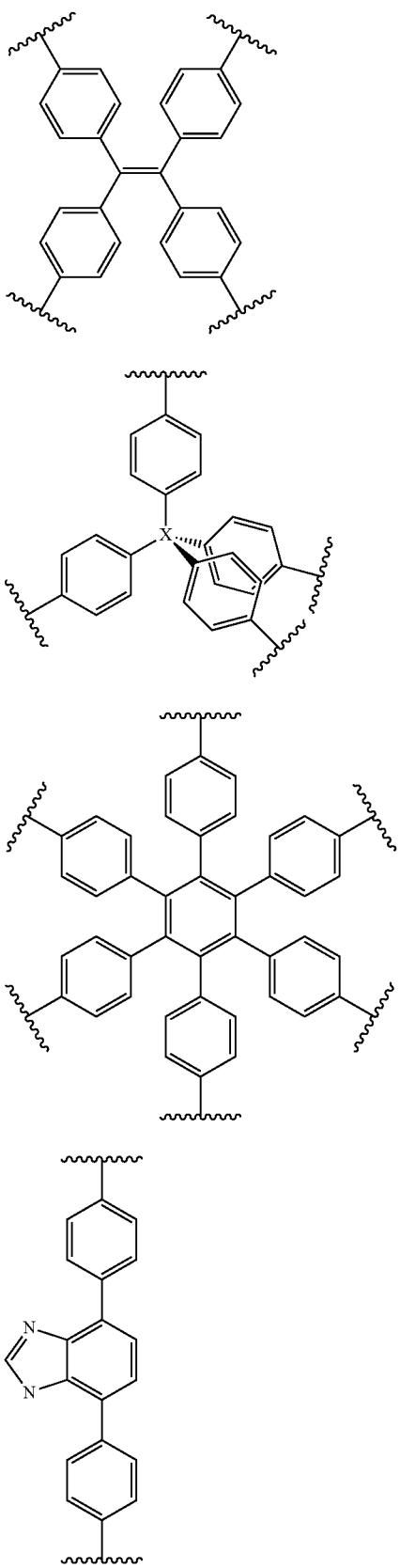

wherein X is a carbon atom or a silicon atom, and hydrogen bonded to aromatic rings of Formulae (I) to (VII) (a benzene ring, a benzimidazole ring, and a pyrrole ring) may be substituted with an alkyl group, an alkenyl group, an alkynyl group, an aryl group, an oxo group, a halogen atom, a hydroxy group, a nitro group, a sulfo group, an ether group, a thiol group, an ester group, a carbonate group, a carbonyl group, an amide group, an amino group, an azide group, a carbamate group, a cyano group, a hydroxy group, a carboxyl group, a sulfonic acid ester group, or a sultone group, and (b) a bond selected from the group consisting of —B(—O—)$_2$, —C≡C—, —C—N—, —C=N—, —C—N=C—, and —N—B—N—, and connecting the linkers to each other.

[4]: The composite material described in [1], in which the covalent organic framework (COF) is at least one selected from the group consisting of COF-300, COF-303, LZU-79, and LZU-111.

[5]: The composite material described in [1], in which a molecular diameter of the heat-storage compound is smaller than a pore diameter of the covalent organic framework.

[6]: The composite material described in [1], in which the heat-storage compound is at least one selected from the group consisting of water, sodium sulfate decahydrate, sodium acetate trihydrate, and potassium aluminum sulfate dodecahydrate.

[7]: A heat dissipation/storage member containing the composite material described in any one of [1] to [6] as a heat storage/dissipation material.

[8]: The heat dissipation/storage member described in [7], in which the heat dissipation/storage member has a heat dissipation/storage layer that contains the composite material described in any one of [1] to [6] and a heat diffusion layer that is in contact with the heat dissipation/storage layer and diffuses heat from the heat dissipation/storage layer.

[9]: The heat dissipation/storage member described in [8], in which the heat diffusion layer is made of a metal.

[10]: The heat dissipation/storage member described in [9], in which the heat diffusion layer is made of aluminum.

[11]: A method for producing the composite material described in any one of [1] to [6], the method including:
a single crystal production step of reacting covalent organic framework (COF) raw material compounds (the building unit molecules) via a solution containing "an equilibrium adjusting agent" and "an ionic liquid or an organic salt" to grow a COF single crystal; and
a compositing step of adding the heat-storage compound to the COF single crystal to obtain a composite material.

[12]: A covalent organic framework (COF) single crystal, the COF single crystal having a major axis length of larger than 120 μm.

[13]: The COF single crystal described in [12], in which a thermal conductivity is 0.05 Wm$^{-1}$K$^{-1}$ or more.

[14]: The COF single crystal described in [12], in which the covalent organic framework (COF) has a framework structure including (a) a linker selected from the group consisting of Formulas (I) to (VII) below,

[Chemical Formula 2]

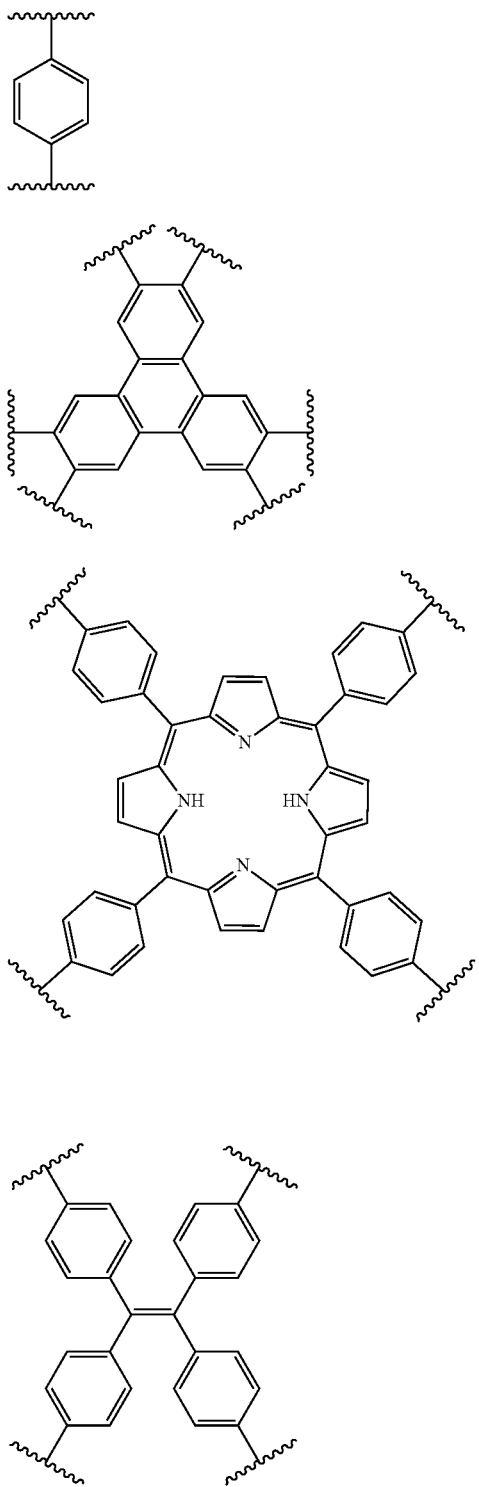

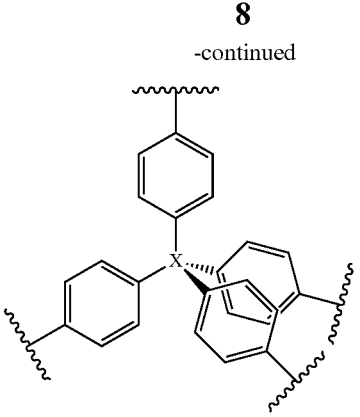

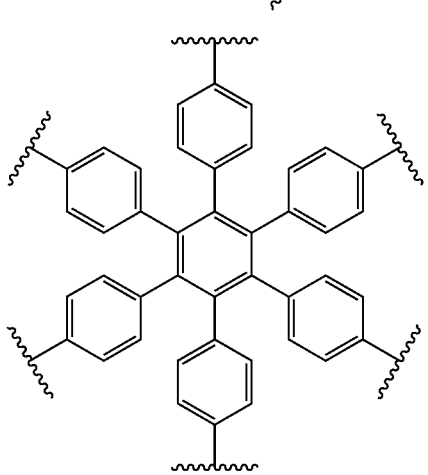

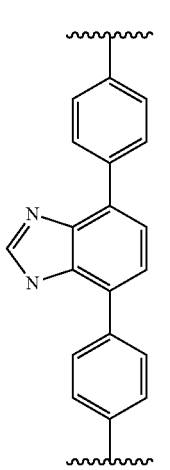

wherein X is a carbon atom or a silicon atom, and hydrogen bonded to aromatic rings of Formulae (I) to (VII) (a benzene ring, a benzimidazole ring, and a pyrrole ring) may be substituted with an alkyl group, an alkenyl group, an alkynyl group, an aryl group, an oxo group, a halogen atom, a hydroxy group, a nitro group, a sulfo group, an ether group, a thiol group, an ester group, a carbonate group, a carbonyl group, an amide group, an amino group, an azide group, a carbamate group, a cyano group, a hydroxy group, a carboxyl group, a sulfonic acid ester group, or a sultone group, and (b) a bond selected from the group consisting of —B(—O—)$_2$, —C=C—, —C—N—, —C=N—, —C—N=C—, and —N—B—N—, and connecting the linkers to each other.

[15]: The COF single crystal described in [14], in which the bond is —C═N—.

[16]: The COF single crystal described in [12], in which the COF single crystal is at least one selected from the group consisting of COF-300, COF-303, LZU-79, and LZU-111.

[17]: A method for producing the COF single crystal described in any one of [12] to [16], the method including a single crystal production step of reacting covalent organic framework (COF) raw material compounds via a solution containing an ionic liquid or an organic salt and an equilibrium adjusting agent to grow a COF single crystal.

[18]: The method for producing the COF single crystal described in [17], in which the raw material compounds are aldehyde having a plurality of formyl groups and amine having a plurality of amino groups.

[19]: The method for producing the COF single crystal described in [17], in which the equilibrium adjusting agent is aldehyde having a single formyl group or amine having a single amino group.

[20]: The method for producing the COF single crystal described in [17], in which the ionic liquid or the organic salt is one or more compounds selected from the group consisting of methyltrioctylammonium bistrifluoromethanesulfonylimide, methyltrioctylammonium chloride, methyltributylphosphonium bistrifluoromethanesulfonylimide, and methyltributylphosphonium iodide.

[21]: The method for producing the COF single crystal described in [20], in which the ionic liquid or the organic salt is methyltrioctylammonium bistrifluoromethanesulfonylimide.

[22]: The composite material described in [1], in which a thermal conductivity is 0.05 $Wm^{-1}K^{-1}$ or more.

According to the present invention, it is possible to provide a COF single crystal having a larger grain size than before and a method for producing the COF single crystal. According to the present invention, it is possible to provide a composite material that uses such a COF single crystal so as to have excellent heat dissipation/storage characteristics, and a heat dissipation/storage member containing the composite material and a method for producing the composite material.

DESCRIPTION OF THE INVENTION

Figure 1:
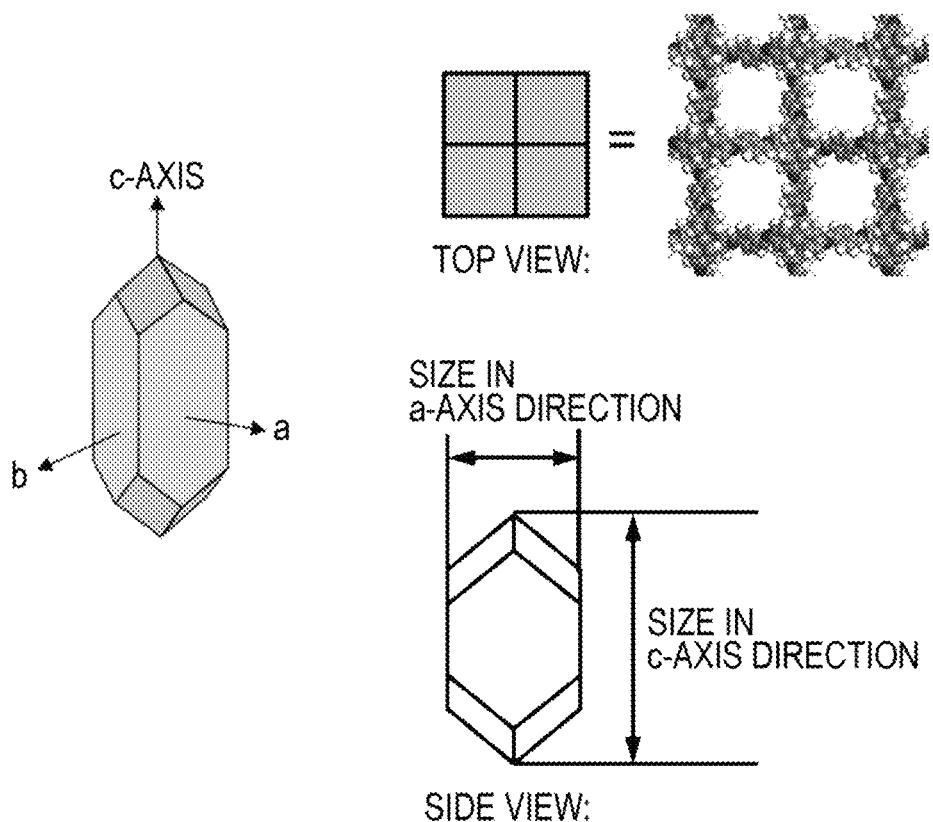
FIG. 1 is a schematic view of a COF single crystal (COF-300).

The present invention can be appropriately modified and implemented without changing the gist thereof.

1. COF Single Crystal

Hereinafter, a COF single crystal of the present invention will be described. The COF single crystal of the present invention has a major axis (c-axis) length of 120 μm or more.

The covalent organic framework (COF) has a framework structure including a linker and a bond connecting the linkers.

The linker is preferably an organic group containing one or more atomic groups selected from the group consisting of a substituted or unsubstituted aromatic ring, a substituted or unsubstituted heterocyclic aromatic ring, a substituted or unsubstituted non-aromatic ring, a substituted or unsubstituted heterocyclic non-aromatic ring, and a substituted or unsubstituted hydrocarbon group.

It is more preferable that the covalent organic framework (COF) has a framework structure including (a) a linker selected from the group consisting of Formulas (I) to (VII) below,

[Chemical Formula3]

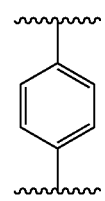

I

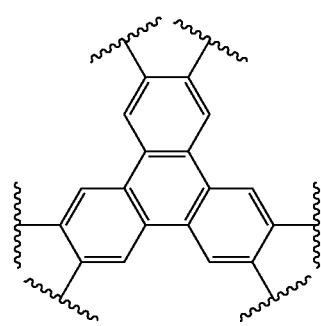

II

III

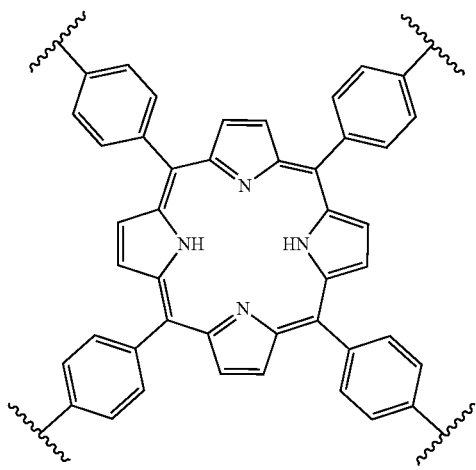

IV

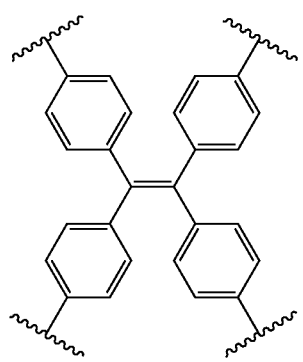

V

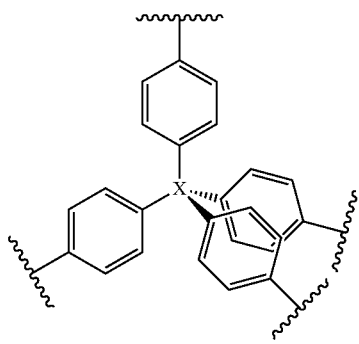

VI

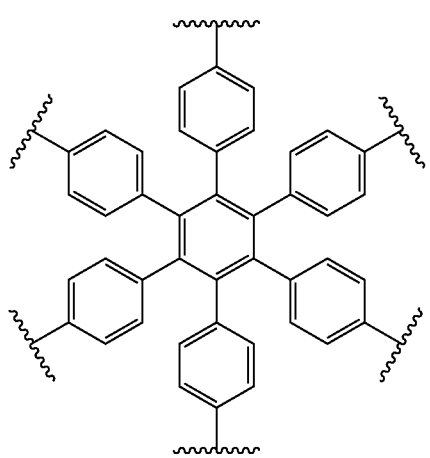

VII

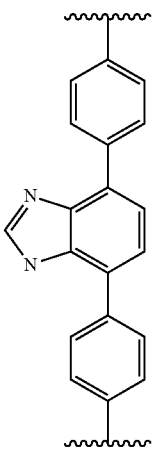

wherein X is a carbon atom or a silicon atom, and hydrogen bonded to aromatic rings of Formulae (I) to (VII) (a benzene ring, a benzimidazole ring, and a pyrrole ring) may be substituted with an alkyl group, an alkenyl group, an alkynyl group, an aryl group, an oxo group, a halogen atom, a hydroxy group, a nitro group, a sulfo group, an ether group, a thiol group, an ester group, a carbonate group, a carbonyl group, an amide group, an amino group, an azide group, a carbamate group, a cyano group, a hydroxy group, a carboxyl group, a sulfonic acid ester group, or a sultone group, and (b) a bond selected from the group consisting of —B(—O—)$_2$, —C≡C—, —C—N—, —C=N—, —C—N=C—, and —N—B—N—, and connecting the linkers to each other.

Among these, the COF of the present invention is preferably at least one selected from the group consisting of COF-300, COF-303, LZU-79, and LZU-111.

Both COF-300 and COF-303 have a molecular structure in which linkers of Formula (I) and Formula (V) (X is carbon) are covalently bonded to each other by —C=N— (a part of the imine bond). The difference between COF-300 and COF-303 is that carbon (C) of the linkage is on the side of Formula (I) and nitrogen (N) is on the side of Formula (V) in COF-300, whereas carbon (C) of the linkage is on the side of Formula (V) and nitrogen (N) is on the side of Formula (I) in COF-303. LZU-79 has a molecular structure in which Formula (V) (X is carbon) and Formula (VII) are covalently bonded to each other by —C=N—, carbon (C) of the linkage is on the side of Formula (VII), and nitrogen (N) is on the side of Formula (V). LZU-111 has a molecular structure in which Formula (V) (X is carbon) and Formula (V) (X is silicon) are covalently bonded to each other by —C=N—, carbon (C) of the linkage is on the side of Formula (V) (X is silicon), and nitrogen (N) is on the side of Formula (V) (X is carbon). For the details of the structures and the like of these compounds Ma et al., "Single-crystal x-ray diffraction structures of covalent organic frameworks", Science 361, 48-52 (2018) can be referred to.

FIG. 1 shows a schematic view of a COF single crystal (COF-300). The left side of this drawing shows a perspective view of the COF single crystal and the right side shows a side view. The COF single crystal is a tetragonal crystal system, and when the COF single crystal is viewed from three axes (a-axis, b-axis, and c-axis), has a two-by-two matrix shape (cross in a square) in top view (bottom view)

as viewed from the c-axis direction and has a hexagonal shape in side view as viewed from the a-axis and b-axis directions. The major axis in the present invention is the c-axis in the drawing, and the COF single crystal of the present invention has a length (size) of 120 µm or more in the c-axis direction. The major axis length of the COF single crystal is preferably 150 µm or more, more preferably 200 µm or more, and particularly preferably 250 µm or more. The upper limit of the major axis length of the COF single crystal is, for example, 1 mm or 10 mm, but may be 10 mm or more.

The COF single crystal has pores in the network framework. In COF-300, the theoretical pore diameter is reported to be 7.8 angstroms (F. J. Uribe-Romo et al. J. Am. Chem. Soc. 131, 4570 (2009)). When this pore diameter is desired to be increased, the pore diameter can be easily increased by changing the linker, for example, changing p-phenylenedialdehyde as a linker to 4,4'-diformylbiphenyl, 4,4''-diformyl-p-terphenyl, or the like. The COF single crystal exhibits various characteristics by adding an element, a compound, or the like into pores to form a composite. The COF single crystal has a very strong structure in which the frameworks interpenetrate each other like a disentanglement puzzle. Therefore, the COF single crystal has thermally, chemically, and physically stable properties.

The thermal conductivity of the COF single crystal is preferably 0.05 $Wm^{-1}K^{-1}$ or more. Since the crystal size of the COF single crystal of the present invention is larger than a conventional aggregate of fine crystal powders having a size of 1 µm or less, the COF single crystal is regarded as a single material. Therefore, in the COF single crystal having a large crystal size, the thermal resistance derived from point contact between fine powder crystals is drastically reduced, and thus the thermal conductivity in a relatively long distance scale (=the size of the single crystal) is high. Therefore, the COF single crystal can be particularly preferably used as a heat storage/dissipation material described below. The thermal conductivity of the COF single crystal is preferably 0.1 $Wm^{-1}K^{-1}$ or more, more preferably 0.2 $Wm^{-1}K^{-1}$ or more, further preferably 0.5 $Wm^{-1}K^{-1}$ or more, and most preferably 1 $Wm^{-1}K^{-1}$ or more.

2. Method for Producing COF Single Crystal

Hereinafter, a method for the COF single crystal will be described. The method for producing the COF single crystal includes a single crystal production step of reacting COF raw material compounds (building unit molecules) via a solution containing an ionic liquid or an organic salt and an equilibrium adjusting agent to grow a COF single crystal.

The covalent organic framework (COF) can be produced using raw material compounds of various combinations between linkages and linkers as building unit molecules. Examples of the raw material compound constituting the COF may include aldehyde having a plurality of formyl groups in aromatic rings (for example, a benzene ring and a pyrrole ring, hereinafter, the same applies) and amine having a plurality of amino groups in aromatic rings. By condensing these aldehyde and amine to form a covalent bond (imine bond), a COF having a bond of —C=N— can be formed.

As the raw material compound for producing the COF, for example, in COF-300, tetrakis(4-aminophenyl)methane (TAM) and terephthalaldehyde (BDA) can be exemplified. As the raw material compound, in COF-303, tetrakis(4-formylphenyl)methane (TFM) and phenylenediamine (PDA) can be exemplified, in LZU-79, TAM and 4,7-bis(4-formylbenzyl)-1H-benzimidazole (BFBZ) can be exemplified, and in LZU-111, TAM and tetrakis(4-formylphenyl) silane (TFS) can be exemplified.

The equilibrium adjusting agent is like a catalyst in a condensation reaction, is not consumed by itself, and functions to increase the reversibility of the condensation reaction. Examples of the equilibrium adjusting agent may include aromatic aldehyde having a single formyl group and aromatic amine having a single amino group. Specific examples of the equilibrium adjusting agent may include aniline and benzaldehyde. The equilibrium adjusting agent is preferably used in an excessive amount with respect to the raw material compound. For example, the amount of the equilibrium adjusting agent is preferably 2 to 200 mol, more preferably 10 to 100 mol, and particularly preferably 20 to 80 mol, with respect to 1 mol of the total amount of the raw material compounds.

The raw material compound and the equilibrium adjusting agent are preferably used by being dissolved in an aqueous or non-aqueous solvent. Examples of such a solvent may include water, pentane, hexane, benzene, toluene, xylene, chlorobenzene, nitrobenzene, cyanobenzene, naphthalene, naphtha, methanol, ethanol, n-propanol, isopropanol, acetone, 1,2,-dichloroethane, dichloromethane, chloroform, carbon tetrachloride, tetrahydrofuran, dimethylformamide, dimethylsulfoxide, N-methylpyrrolidone, dimethylacetamide, diethylformamide, thiophene, pyridine, ethanolamine, triethylamine, ethylenediamine, diethyl ether, acetonitrile, and dioxane.

The ionic liquid is a normal temperature molten salt containing only ions, and an anion and a cation are paired. In the organic salt, an anion and a cation are paired similarly to the ionic liquid, but the organic salt is a solid at normal temperature. In X. Guan et al. "Fast, Ambient Temperature and Pressure Ionothermal Synthesis of Three-Dimensional Covalent Organic Frameworks" J. Am. Chem. Soc. 140, 4494 (2018), the ionic liquid has an acid catalytic effect of promoting condensation (imine formation reaction) between raw material compounds, the ionic liquid is simultaneously used as a solvent and an acid catalyst instead of an organic solvent that has been used before. However, in order to obtain a single crystal having a large size, crystal growth from a homogeneous solution in which raw material molecules are completely dissolved is required. In the crystal production method of X. Guan et al. "Fast, Ambient Temperature and Pressure Ionothermal Synthesis of Three-Dimensional Covalent Organic Frameworks" J. Am. Chem. Soc. 140, 4494 (2018), since the solubility of building unit molecules (for example, tetrakis(4-aminophenyl)methane molecules used in the present invention) in an ionic liquid is low, undissolved building block molecules dispersed in a solution become "sources" (=crystal nuclei) of crystal growth, resulting in generation of a large amount of fine single crystals. On the other hand, the present inventors expect a control action (described below) on the COF crystal growth rate of the ionic liquid different from that of X. Guan et al. "Fast, Ambient Temperature and Pressure Ionothermal Synthesis of Three-Dimensional Covalent Organic Frameworks" J. Am. Chem. Soc. 140, 4494 (2018), and generate a COF single crystal using a homogeneous solution as an additive to an organic solvent, not as a solvent. In the present invention, in order to obtain a large crystal in a short time, the following findings have been obtained, starting from an unconventional novel idea in which a hydrogen bond between an anion constituting an ionic liquid and a functional group present on a growing crystal surface is used as a control mean of crystal nucleation/growth while acetic acid of about 9 times the amount of the catalyst (1.2 mmol of acetic acid) used in Ma et al., "Single-crystal x-ray diffraction structures of covalent organic frameworks", Science 361, 48-52 (2018) is added.

Specific examples of the ionic liquid or the organic salt may include methyltrioctylammonium bistrifluoromethanesulfonylimide, methyltrioctylammonium chloride, methyltributylphosphonium bistrifluoromethanesulfonylimide, and methyltributylphosphonium iodide. The amount of the ionic liquid or the organic salt is preferably 0.1 to 100 mol, more preferably 0.5 to 10 mol, and particularly preferably 1 to 5 mol, with respect to 1 mol of the total amount of the raw material compounds.

As the ionic liquid or the organic salt, from the viewpoint of producing a COF single crystal having a large size, an ionic liquid or an organic salt in which both Lewis acidity of a cation and Lewis basicity of an anion are weak is preferred. From this point, among the specific examples, methyltrioctylammonium bistrifluoromethanesulfonylimide ($[N_{8881}]$ $[NTf_2]$) is particularly preferred. Hereinafter, the reason for this will be described.

In a COF having an imine bond such as COF-300, an acid catalyst is required for an imine bond formation reaction. By adding an ionic liquid having a cation with strong Lewis acidity, such as Nat, to a raw material compound, the cation serves as a Lewis acid catalyst, a COF formation reaction is greatly promoted, a large amount of crystal nuclei are generated, and a large amount of the raw material compound is consumed. Therefore, the number of raw material molecules that can be used in the subsequent crystal growth stage decreases, and a crystal cannot be grown to a crystal having a sufficiently large size, resulting in generation of a large amount of fine crystals. From this point, an ionic liquid or an organic salt having a cation with weak Lewis acidity is advantageous for crystal growth.

On the other hand, as described above, a hydrogen bond is generated between the anion of the ionic liquid and an unreacted functional group present on the surface of the COF single crystal. The stronger the Lewis basicity of the anion is, the stronger the hydrogen bond is, the more the COF formation reaction is inhibited, and the slower the nucleation and crystal growth are. In the present invention, in order to suppress a large amount of nucleation, anions each having different Lewis basicity were used to control the rate of crystal growth. As a result, among the anions of the ionic liquid used in the present invention, $[NTf_2]^-$ having the weakest Lewis basicity has the optimum Lewis basicity strength, and a COF crystal having the largest size was obtained. In particular, it is considered that the same applies to the case of an organic salt dissolved in a solvent.

Figure 2:
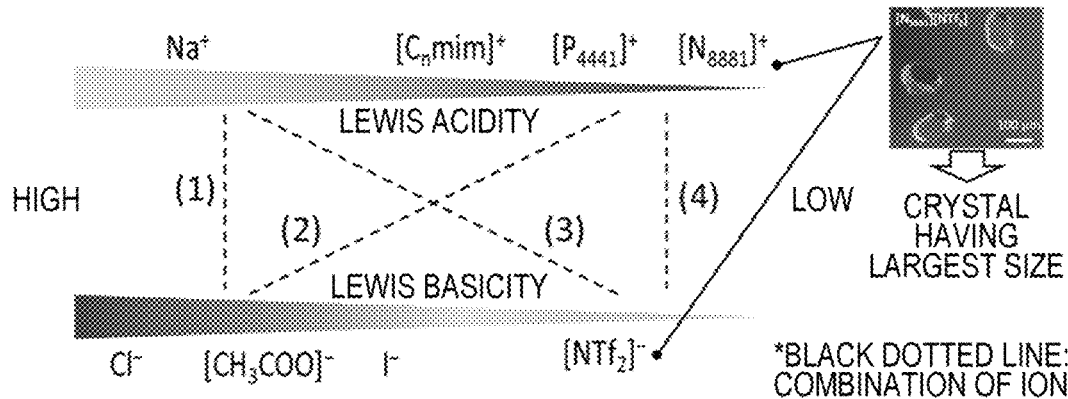
FIG. 2 is a view illustrating the Lewis acidity of a cation and the Lewis basicity of an anion of an ionic liquid or an organic salt.

FIG. 2 is a view illustrating the Lewis acidity of a cation and the Lewis basicity of an anion of an ionic liquid or an organic salt mentioned as the specific example described above. As illustrated in this drawing, methyltrioctylammonium bistrifluoromethanesulfonylimide ($[N_{8881}]$ $[NTf_2]$) is a combination of methyltrioctylammonium ($[N_{8881}]$) having the weakest Lewis acidity and bistrifluoromethanesulfonylimide ($[NTf_2]$) having the weakest Lewis basicity. Therefore, as shown in Examples described below, as compared with the case of using another ionic liquid or another organic salt, when methyltrioctylammonium bistrifluoromethanesulfonylimide ($[N_{8881}]$ $[NTf_2]$) is used, a COF single crystal having a large grain size can be obtained.

Regarding the chemical property (Lewis basicity) of a basic solvent, a "donor number (DN)" is mentioned as an indicator that can be a measure of the enthalpy of adduct formation with a reference Lewis acid. On the other hand, regarding an acidic solvent, an "acceptor number (AN)" is mentioned as a parameter for evaluating the Lewis acidity of the acidic solvent. The Lewis acidity of a cation and the Lewis basicity of an anion of the ionic liquid can be quantitatively evaluated by the number of acceptors of the cation and the number of donors of the anion, respectively.

The number of donors of the anion of the ionic liquid used in the present invention is shown in the following table (source: M. Holzweber et al. Chem. Eur. J. 19, 288-293 (2013)). Under the condition of using the same cation (1-butyl-3-methylimidazolium: $C_4$ min$^+$), the number of donors of the anion is in the order shown in this table. The smaller the number of donors, the weaker the Lewis basicity.

TABLE 1

| Cation | Anion | DN |
|---|---|---|
| $C_4mim^+$ | $Cl^-$ | 22.6 |
| $C_4mim^+$ | $CH_3COO^-$ | 11.32 |
| $C_4mim^+$ | $I^-$ | 7.59 |
| $C_4mim^+$ | $NTf_2^-$ | −3.44 |

In the ionic liquid used in the present invention, under the condition that the cation is $C_4mim^+$, the number of donors (DN) of the anion is preferably 0 or less and more preferably −3.00 or less.

In the COF formation reaction, an acid catalyst other than the cation of the ionic liquid or the organic salt is preferably used in combination. Examples of such an acid catalyst may include acetic acid and hydrochloric acid. The amount of the acid catalyst is preferably 2 to 200 mol, more preferably 10 to 150 mol, and particularly preferably 50 to 100 mol, with respect to 1 mol of the total amount of the raw material compounds.

The COF formation reaction can be appropriately performed under preferable conditions. As for the temperature of the COF formation reaction, the COF formation reaction can be performed, for example, at 10 to 60° C., preferably 20 to 50° C., and more preferably room temperature (about 25° C.). The growth of a COF single crystal exceeding 120 μm is completed in about 1 to 30 days, and can be completed within 10 days (7 days in Examples described below) depending on conditions. It is also the effect of the production method of the present invention that a COF single crystal having a large size can be obtained in such a short period of time as compared to the technique described in Ma et al., "Single-crystal x-ray diffraction structures of covalent organic frameworks", Science 361, 48-52 (2018).

3. Composite Material Using COF Single Crystal

Hereinafter, a composite material using the COF single crystal will be described. The composite material of the present invention includes a covalent organic framework (COF) single crystal having a major axis length of larger than 120 μm or a COF polycrystal including a plurality of the single crystals, and at least one heat-storage compound.

As the COF single crystal, the COF single crystal described above can be used. The COF polycrystal includes a plurality of the COF single crystals. (a) Near room temperature, the COF single crystal preferably has a higher thermal conductivity than that of the heat-storage compound in a bulk state. The thermal conductivity in a bulk state means a thermal conductivity in a state of only the heat-storage compound and is not the thermal conductivity of the heat-storage compound in a state of being composited with the COF single crystal.

The heat-storage compound is (1) a compound that generates heat or absorbs heat by adsorption to or desorption from the COF single crystal or (2) a compound that generates heat or absorbs heat by a phase change or a chemical reaction occurring within a range of −20 to 200° C. When these adsorption, desorption, phase change, and chemical reaction are reversible, the composite material can be repeatedly used as a heat dissipation/storage member described below, which is preferable.

The heat-storage compound (1) can adsorb to the surface or the inside (pores) of the COF single crystal to store heat as adsorption enthalpy; meanwhile, the heat-storage compound (1) can desorb from the COF single crystal to dissipate the stored adsorption enthalpy as heat. Examples of such a heat-storage compound may include water.

The heat-storage compound (2) is a compound that absorbs or dissipates latent heat by own phase change or heat by a chemical reaction. A phase-changing material among these materials is generally called a phase change material (PCM). The heat-storage compound (2) in the present invention is a compound that generates heat or absorbs heat by a phase change or a chemical reaction occurring within a range of −20 to 200° C. Examples of such a heat-storage compound may include sodium sulfate decahydrate, sodium acetate trihydrate, and potassium aluminum sulfate dodecahydrate. These heat-storage compounds may be used singly or in combination of two or more kinds thereof.

The molecular diameter of the heat-storage compound is preferably smaller than the pore diameter of the COF. This makes it possible to incorporate the heat-storage compound into the pores of the COF to store or dissipate heat. However, the present invention is not limited thereto, and even when the molecular diameter of the heat-storage compound is larger than the pore diameter of the COF, absorption heat and heat generation by the heat-storage compound may occur on the surface of the COF single crystal or the like.

Figure 3:
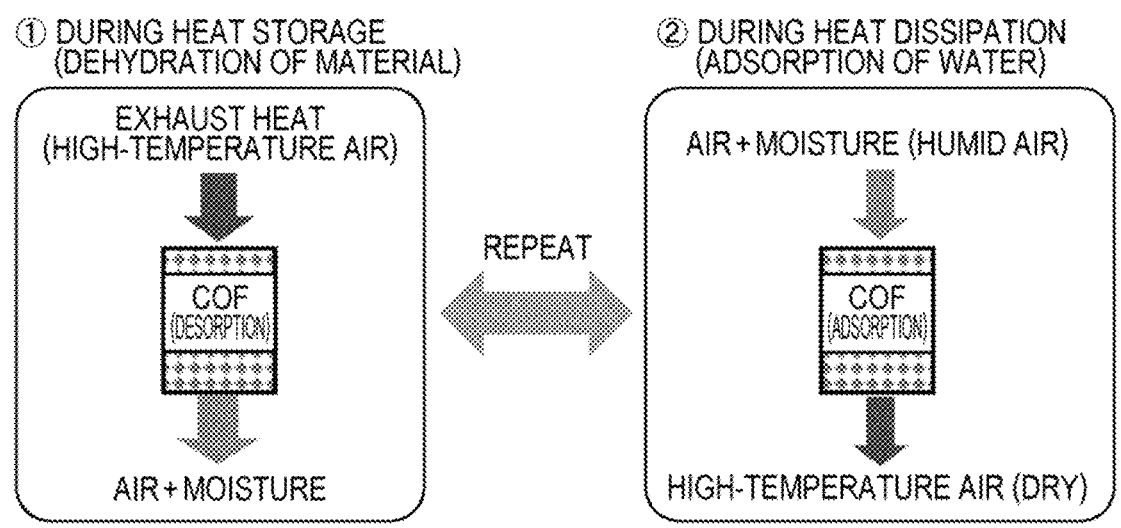
FIG. 3 is a schematic view in which heat dissipation/storage is performed using a composite material.

FIG. 3 is a schematic view in which heat dissipation/storage is performed using the composite material of the present invention. During heat storage, the heat-storage compound (water in this drawing) incorporated into the COF comes into contact with high-temperature air and desorbs from the COF, so that enthalpy increases, and air and moisture are exhausted. On the other hand, during heat dissipation, water out of air and moisture is adsorbed to the COF, so that enthalpy decreases to generate heat, and dry high-temperature air is dissipated.

The thermal conductivity of the composite material is preferably 0.05 $Wm^{-1}K^{-1}$ or more from the viewpoint that heat exchange can be rapidly performed. The thermal conductivity thereof is more preferably 0.1 $Wm^{-1}K^{-1}$ or more, further preferably 0.2 $Wm^{-1}K^{-1}$ or more, further preferably 0.5 $Wm^{-1}K^{-1}$ or more, and most preferably 1 $Wm^{-1}K^{-1}$ or more Near room temperature, the thermal conductivity of the composite material is preferably higher than that in a bulk state of the heat-storage compound constituting the composite material.

4. Method for Producing Composite Material

A method for producing the composite material of the present invention performs the single crystal production step described in the method for producing the COF single crystal described above and includes a compositing step of adding a heat-storage compound to the COF single crystal subsequently obtained to obtain a composite material. The single crystal production step has been described above, and this detailed description will be omitted here. In the compositing step, a heat-storage compound is added to the COF single crystal to obtain a composite material. A method of adding the heat-storage compound to the COF single crystal is not particularly limited, and the addition of the heat-storage compound can be performed under appropriate conditions (for example, 10 to 50° C., 1 to 100 hours, and the like) depending on the types of the COF single crystal and the heat-storage compound. For example, a method of immersing a COF single crystal in a heat-storage compound in a molten state under a temperature condition at which the heat-storage compound is liquefied and impregnating heat-storage compound molecules with pores of the COF. More specifically, for example, in the case of sodium acetate trihydrate, a composite is formed by melting the sodium acetate trihydrate at 57.5° C. or higher and bringing the sodium acetate trihydrate into contact with the COF single crystal.

5. Heat Dissipation/Storage Member

The composite material of the present invention can be suitably used as a heat storage/dissipation material in a heat dissipation/storage member. The heat dissipation/storage member of the present invention has a heat dissipation/storage layer that contains the composite material and a heat diffusion layer that is in contact with the heat dissipation/storage layer (including the case of interposing a brazing layer containing a "low-melting-point metal material" described below) and diffuses heat from the heat dissipation/storage layer. The heat diffusion layer is preferably a metal having a high thermal conductivity, or the like, and is particularly suitably aluminum.

Figure 4A:
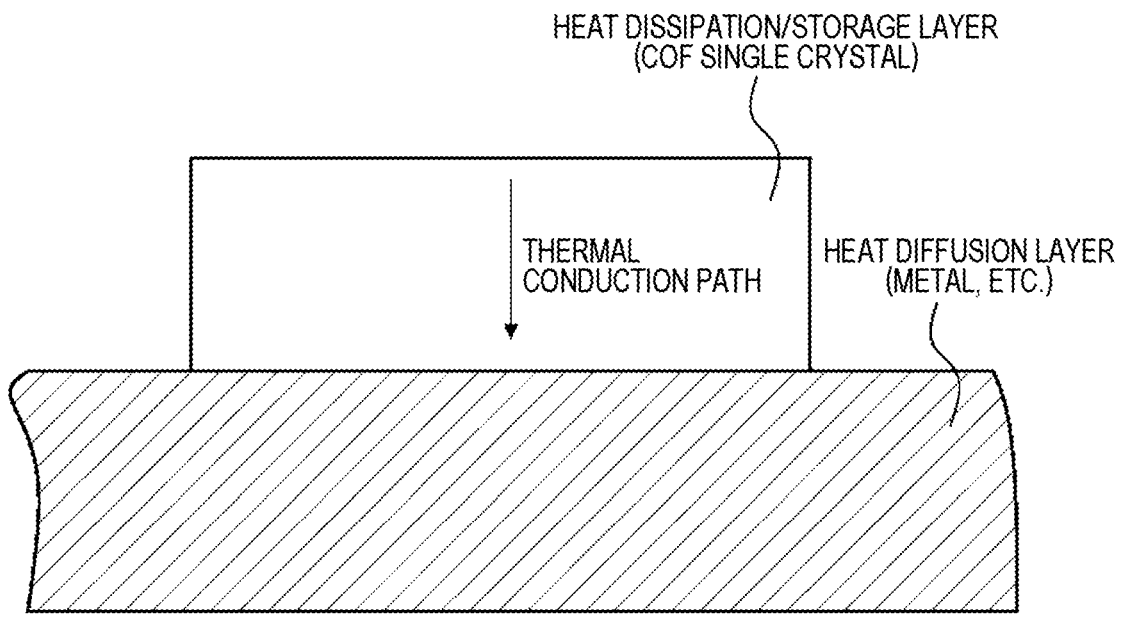
FIGS. 4A and 4B are schematic views illustrating an example of a heat dissipation/storage member.
Figure 4B:
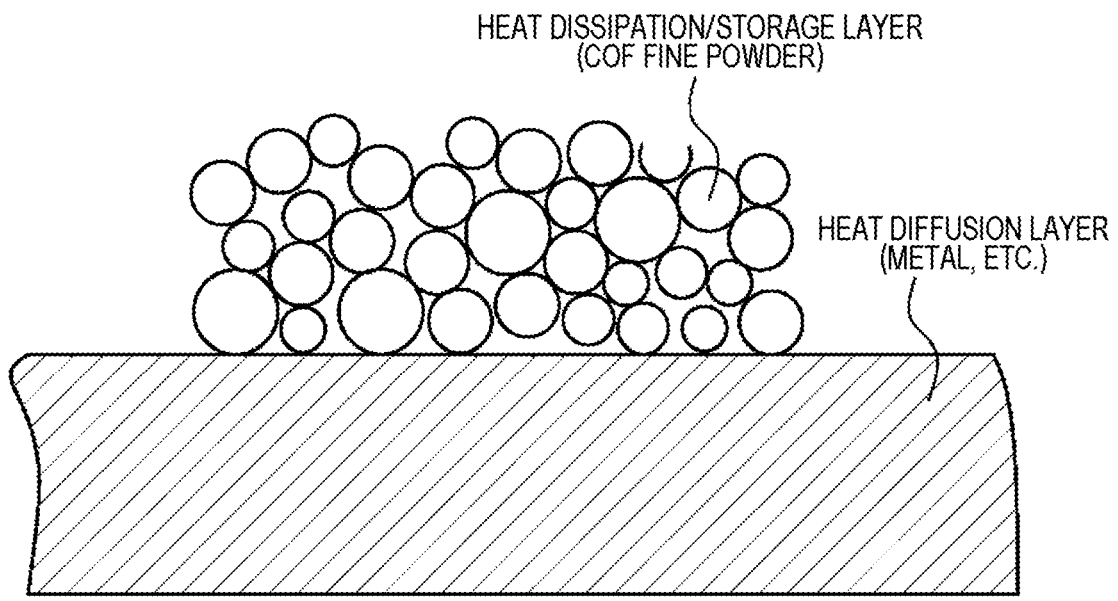

FIGS. 4A and 4B are schematic views illustrating an example of a heat dissipation/storage member, in which FIG. 4A illustrates an example of using a COF single crystal having a large grain size of the present invention and FIG. 4B illustrates an example assumed when a conventional COF fine powder is used. As illustrated in FIG. 4A, a thermal conduction path (passage) is formed by the framework structure of the COF in the COF single crystal, and this thermal conduction path transfers heat from the surface of the COF single crystal to the other surface through the inside of the COF single crystal. Since the major axis length of the COF single crystal of the present invention is as large as 120 µm or more, the length of the thermal conduction path is also long. On the other hand, as shown in FIG. 4B, when a conventional COF fine powder or a small single crystal is used, it is necessary to laminate a large number of small grains in order to form a long thermal conduction path. In this case, the grains are in point contact and are difficult to be in contact in a wide area. When the grain is not a single crystal, a grain boundary exists also in the grain. Therefore, the COF single crystal having a large crystal size as in the present invention is more excellent in thermal conduction efficiency than an example assumed when a conventional COF fine powder is used, and is more preferable as a heat dissipation/storage member.

Examples of a method of laminating the heat dissipation/storage layer containing the composite material and the heat diffusion layer include a method of growing a COF single crystal directly on a material constituting a heat diffusion layer and then adding a heat-storage compound to the COF single crystal to form a composite material, a method of brazing a COF single crystal with a low-melting metal material such as indium on a material constituting a heat diffusion layer and then adding a heat-storage compound to the COF single crystal to form a composite material, and a method of adding a heat-storage compound to a COF single crystal to form a composite material and then brazing the composite material on a material constituting a heat-storage compound.

When a metal member having a heat dissipation fin is used as the heat diffusion layer, the heat dissipation/storage member can be a radiator. Examples of use applications of the heat dissipation/storage member may include automobiles, computers, home televisions, OA devices, mobile phones, smartphones, lightings, air conditioners, and power supply devices.

EXAMPLES

Hereinafter, the present invention will be specifically described based on Examples; however, these are not intended to limit the object of the present invention. The present invention is not limited to these Examples.

1. Example 1: Synthesis of COF-300 Single Crystal 1-1: Preparation of Solution and Crystal Growth First, to a glass vial having a volume of 6 mL, 3.35 mg (0.025 mmol; this is regarded as 1 equivalent) of a solid powder of terephthalaldehyde (hereinafter, BDA) was weighed and placed. Then, to this vial, 0.25 mL of dioxane and 0.03 mL of aniline (both are liquids) were weighed and placed. Subsequently, BDA was dissolved by performing ultrasonic dispersion for 10 minutes to obtain Liquid A.

Subsequently, to another glass vial having a volume of 6 mL, 4.76 mg (0.0125 mmol, 0.5 equivalents) of a solid powder of tetrakis(4-aminophenyl)methane (hereinafter, TAM) was weighed and placed. Then, to this vial, 0.25 mL of dioxane was weighed and placed. Subsequently, TAM was dissolved by performing ultrasonic dispersion for 10 minutes to obtain Liquid B. The molecular structures of the raw materials are shown below.

[Chemical Formula 4]

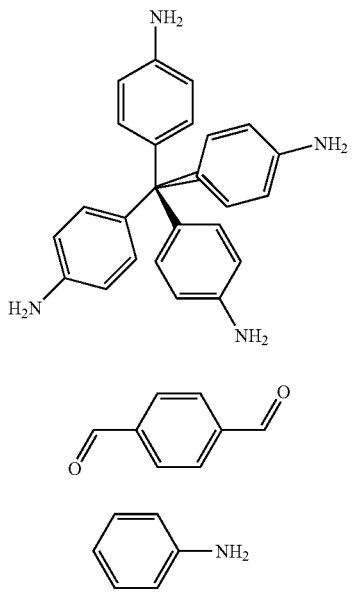

TAM

BDA

Aniline

Subsequently, to another glass vial having a volume of 6 mL, 0.16 mL (2.8 mmol) of acetic acid and an additive (one of Nos. #1 to #11) shown in the following table were weighed and placed to obtain Liquid C. #1 is used in conventional COF synthesis (Comparative Example).

TABLE 2

| No. | Name | Type | State at room temperature | Used amount |
|---|---|---|---|---|
| #1 | Ultrapure water | Ultrapure water | Liquid | 2.2 mmol |
| #2 | [EIM] [NTf$_2$] | Ionic liquid | Liquid | 0.07 mmol |
| #3 | [C$_2$ mim] [NTf$_2$] | Ionic liquid | Liquid | 0.07 mmol |
| #4 | [C$_6$ mim] [NTf$_2$] | Ionic liquid | Liquid | 0.07 mmol |
| #5 | [C$_{10}$ mim] [NTf2] | Ionic liquid | Liquid | 0.07 mmol |
| #6 | [C$_2$ mim] [Acetate] | Ionic liquid | Liquid | 0.07 mmol |
| #7 | [P$_{4441}$) [NTf$_2$] | Ionic liquid | Liquid | 0.07 mmol |
| #8 | [N$_{8881}$] [NTf$_2$] | Ionic liquid | Liquid | 0.07 mmol |
| #9 | [P$_{4441}$] [I] | Organic salt | Solid | 0.07 mmol |
| #10 | [N$_{8881}$] [Cl] | Organic salt | Solid | 0.07 mmol |
| #11 | [Na] [NTf$_2$] | Organic salt | Solid | 0.07 mmol |

The molecular structures of the additives (the ionic liquid and the organic salt) are shown below.

[Chemical Formula 5]

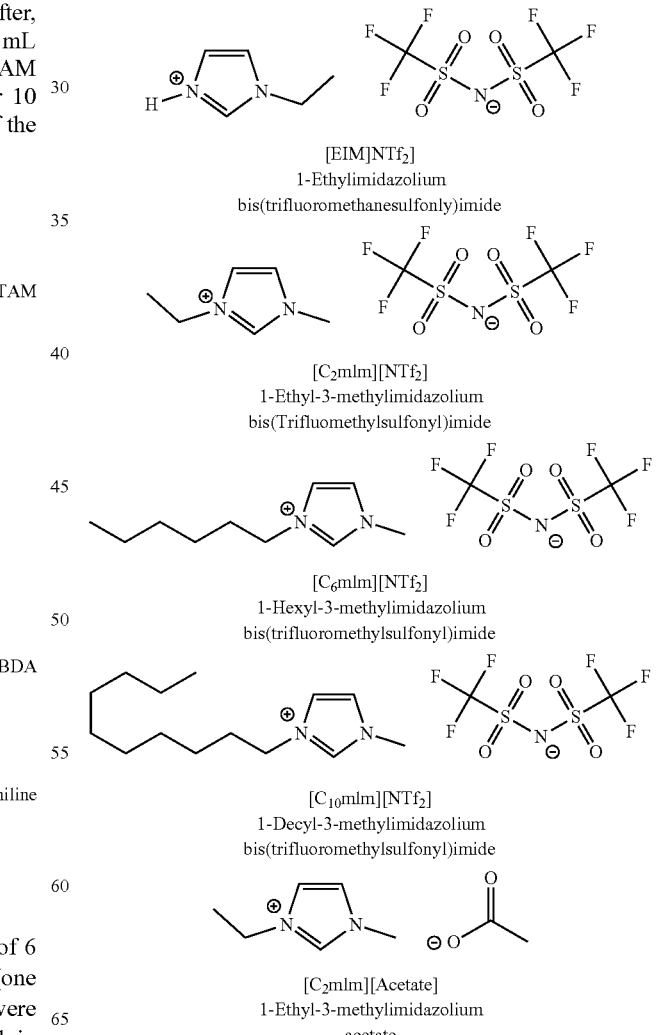

[EIM]NTf$_2$
1-Ethylimidazolium
bis(trifluoromethanesulfonly)imide

[C$_2$mlm][NTf$_2$]
1-Ethyl-3-methylimidazolium
bis(Trifluomethylsulfonyl)imide

[C$_6$mlm][NTf$_2$]
1-Hexyl-3-methylimidazolium
bis(trifluoromethylsulfonyl)imide

[C$_{10}$mlm][NTf$_2$]
1-Decyl-3-methylimidazolium
bis(trifluoromethylsulfonyl)imide

[C$_2$mlm][Acetate]
1-Ethyl-3-methylimidazolium
acetate

-continued

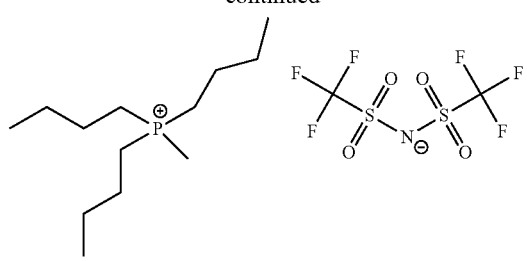

[P₄₄₄₁][NTf₂]
Tributylmethylphosphonium
bis(trifluoromethylsulfonyl)imide

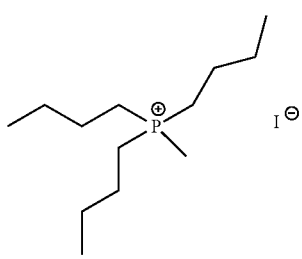

[P₄₄₄₁][I]
Tributylmethylphosphonium
Iodide

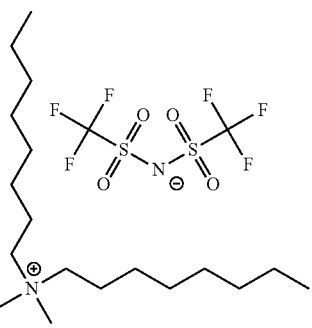

[N₆₈₈₁][NTf₂]
Methyltrioctylammonium
bis(trifluoromethylsulfonyl)imide

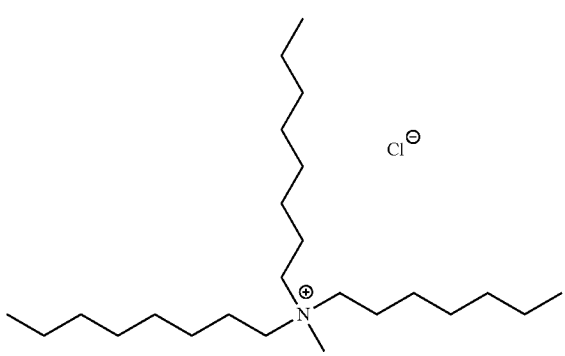

[N₆₈₈₁][Cl]
Methyltrioctylammonium
chloride

-continued

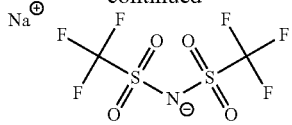

[Na][NTf₂]
Sodium
bis(trifluoromethylsulfonyl)imide

Thereafter, to a glass vial having a volume of 2 mL, Liquid A and Liquid C were mixed and subjected to ultrasonic dispersion for about 5 minutes. Liquid B was gently added to this vial, and the vial was left to stand still in a dark place for 7 days. Crystals appeared on the bottom surface and the inner peripheral wall surface of the vial from the second day, and growth was almost stopped on the seventh day. Then, the crystals were taken out by the following procedure, and washed and dried.

1-2: Washing and Drying of Obtained Single Crystal

Figure 5:
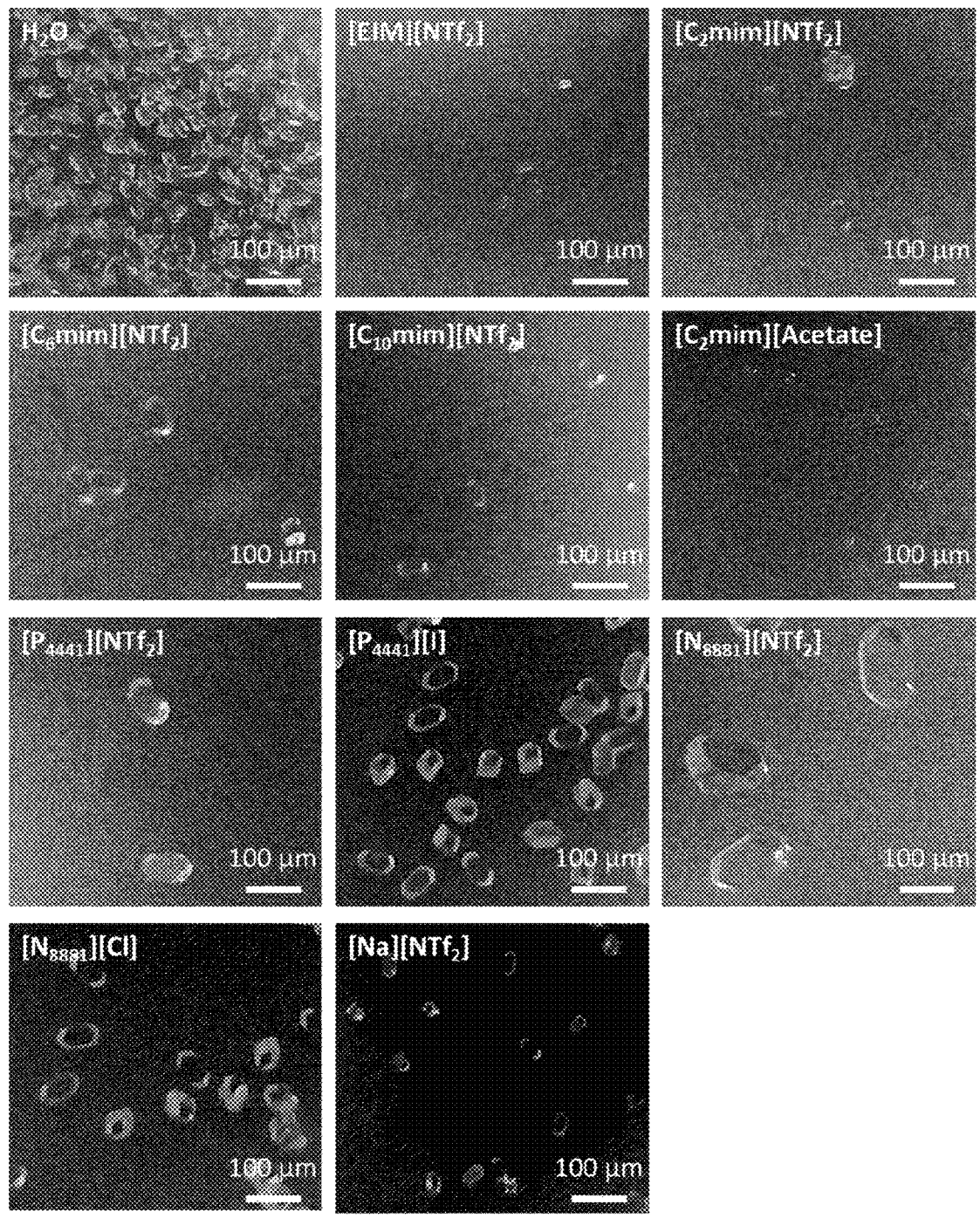
FIG. 5 shows micrographs of COF crystals prepared in Examples.

After the above crystal growth, a single crystal group of COF-300 thus grown was obtained by aspiration with a Pasteur pipette. This single crystal group was washed with dioxane, acetone, and toluene in this order. In the final toluene washing, the single crystal group was separated with filter paper. This single crystal group was placed in an annular electric furnace together with the filter paper, and dried at 95° C. for 8 hours while flowing dry nitrogen gas. The summary of results is shown in the following table. Micrographs of the obtained crystals are shown in FIG. 5.

TABLE 3

| No. | Summary of result |
|---|---|
| #1 | Fine crystal (method or "conventional tecnnique 1") |
| #2 | Small amount, fine crystal |
| #3 | Small amount, fine crystal |
| #4 | Small amount, fine crystal |
| #5 | Small amount, fine crystal |
| #6 | Almost no crystal was precipitated |
| #7 | The crystal size is about 2 times that of "conventional technique 1" |
| #8 | The crystal size is about 4 times that of "conventional technique 1" |
| #9 | The crystal size is about 1.5 times that of "conventional technique 1" |
| #10 | The crystal size is about 1.5 times that of "conventional technique 1" |
| #11 | Large amount, fine crystal |

Figure 6:
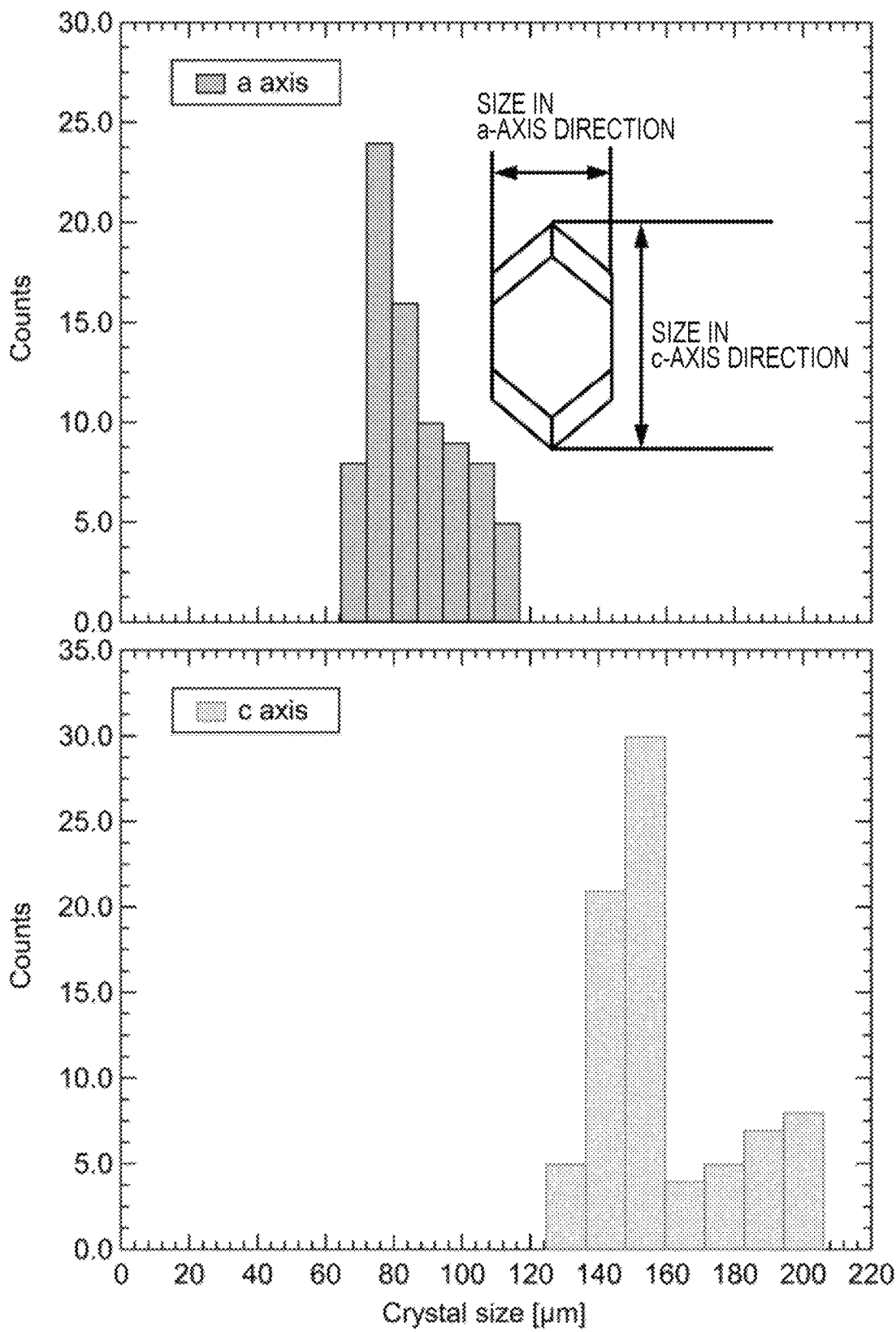
FIG. 6 shows a histogram showing crystal sizes of the COF single crystals prepared in Examples.

From this result, it was found that the result of Additive #8 was the best. For Additive #8, 80 crystals were counted, and a histogram of the crystal size distribution was prepared. FIG. 6 shows a histogram. The upper part of the drawing shows the result of the a-axis (minor axis) length, and the lower part thereof shows the result of the c-axis (major axis) length. It was found that all the a-axis lengths exceed 60 μm, and all the c-axis lengths exceed 120 μm. The largest one had a c-axis length of approximately 200 μm.

2. Measurement of Water Vapor Adsorption Heat of COF-300 Single Crystal

Figure 7:
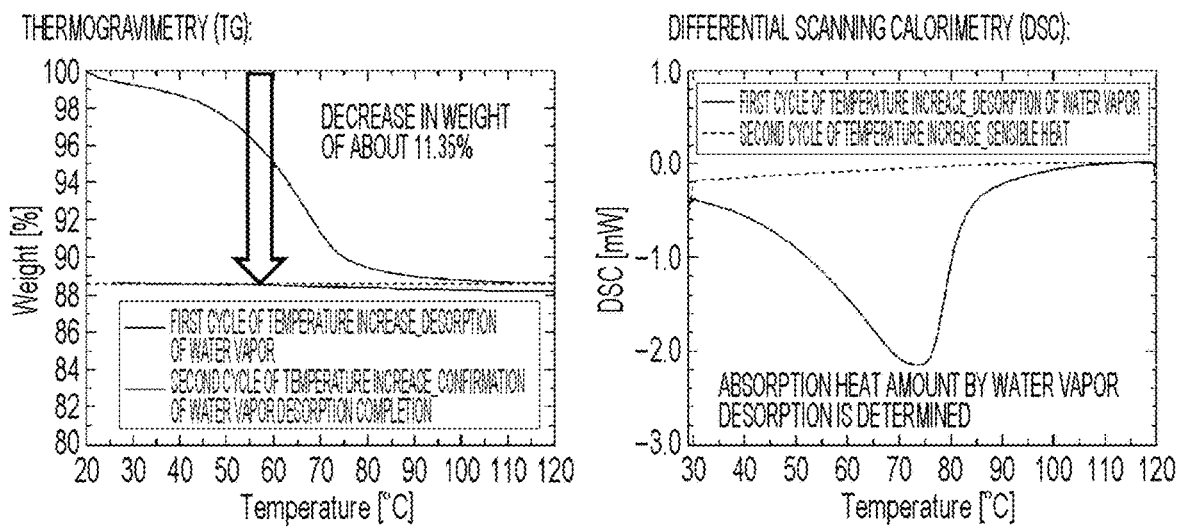
FIG. 7 shows graphs showing results obtained by measuring adsorption or desorption of water molecules to or from a COF single crystal (COF-300) by thermogravimetry/differential scanning calorimetry.

The water vapor adsorption heat of the COF-300 single crystal obtained in Additive #8 described above was measured. A differential scanning calorimeter (DSC-60 manufactured by SHIMADZU CORPORATION) was used, a water vapor adsorption saturated sample was used, the COF-300 single crystal was placed in a measurement cell, and thermogravimetry (TG) and differential scanning calorimetry (DSC) were performed under the conditions of a dry nitrogen environment and a temperature increase of 5° C./min. In this measurement, water vapor corresponds to the "heat-storage compound" of the invention of the present application, and the water vapor adsorption saturated sample (water vapor saturated COF-300 single crystal) corresponds to the "composite material" of the present application. Results thereof are shown in FIG. 7. In the first cycle of the temperature increase, desorption of water vapor was performed, and it was confirmed that, in the second cycle of the temperature increase, desorption of water vapor was completed in the first cycle.

From these results, the water vapor adsorption heat of the COF-300 single crystal was determined as $\Delta h = 2345.5$ kJ/kg ($H_2O$) by dividing the absorption heat amount measured above by the weight of adsorbed water. This is approximately equal to the enthalpy of vaporization of water at room temperature. This suggests that the interaction between the $H_2O$ molecule and the framework of COF-300 is considered to be equivalent to the interaction between the $H_2O$ molecules and is strong. In the invention of the present application, as described below, since the thermal conductivity can be several times that of the powder by increasing the size of the single crystal, a heat storage/dissipation system with an improved heat storage/dissipation rate can be provided.

3. Specific Heat Measurement of COF-300 Single Crystal

Figure 8:
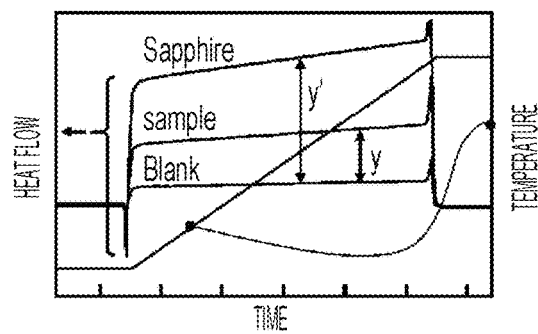
FIG. 8 shows graphs showing results obtained by measuring specific heat of the COF single crystal (COF-300) by differential scanning calorimetry according to a three-point method.
Figure 8:
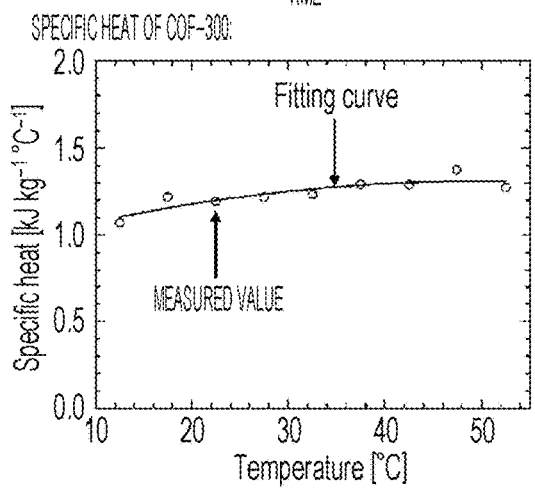

The specific heat of the COF-300 single crystal obtained in Additive #8 described above was using DSC with a differential scanning calorimeter (PerkinElmer, DSC 8000) by a three-point method. In this measurement, a dried COF-300 sample was used. As for the measurement of the specific heat, the specific heat was determined using a three-point method at 10 to 55° C. at intervals of 5° C. The measurement error was corrected by a difference between the measured value of sapphire attached to the above-described differential scanning calorimeter and the literature value. Results thereof are shown in FIG. 8. From this result, a specific heat $C_P$ of the COF-300 single crystal was 1.19 kJ $kg^{-1}K^{-1}$.

4. Thermal Diffusivity Measurement of COF-300 Single Crystal

Figure 9:
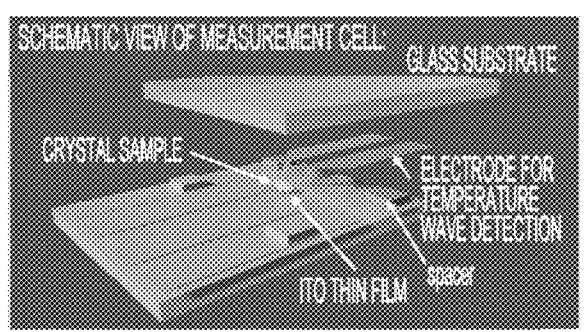
FIG. 9 shows a schematic view of a measurement cell used in a temperature wave analysis method, a microscope image of a COF single crystal (COF-300) sample used in measurement, and a graph showing results obtained by measuring the thermal diffusivity of the sample by the temperature wave analysis method.
Figure 9:
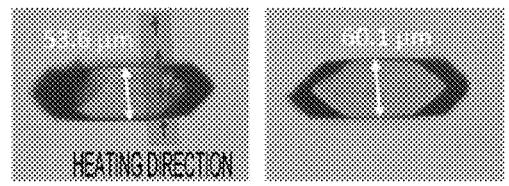
Figure 9:
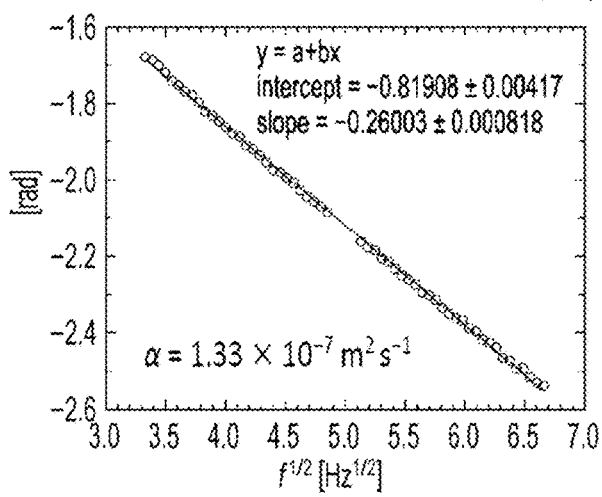

The thermal diffusivity of the COF-300 single crystal obtained in Additive #8 described above was measured by a temperature wave analysis method. The temperature wave analysis method is a method of measuring the phase delay of alternating-current temperature in a thickness direction of a sample, and the thermal diffusivity is determined from a change in the phase delay of the temperature wave measured while a frequency is changed. The measurement is performed in the atmosphere, and the water vapor adsorption state of the single crystal sample is unknown. FIG. 9 shows the summary and result of this measurement. The outline of the measurement cell is as shown in "Schematic view of measurement cell" in the drawing. As shown in this drawing, a crystal sample is placed on an ITO thin film formed on a surface of a glass substrate, and a temperature wave is detected by an electrode. The heating direction of the crystal is the traverse direction (a-axis direction) of the crystal. As a result, the thermal diffusivity of the COF-300 single crystal was $\alpha = 1.33 \times 10^{-7}$ $m^2s^{-1}$.

5. Thermal Conductivity of COF-300 Single Crystal

Then, the thermal conductivity of the COF-300 single crystal was calculated using the values of the specific heat and the thermal diffusivity measured so far. A thermal conductivity $\lambda$ of a single crystal sample was calculated by the following equation.

$$\lambda = \alpha \cdot C_P \cdot \rho \quad \text{(Equation)}$$

wherein $\alpha$ is thermal diffusivity, $C_P$ is specific heat, and $\rho$ is density.

The density of the single crystal sample was calculated with Material Studio using the crystal structure data of the COF-300 single crystal of Ma et al., "Single-crystal x-ray diffraction structures of covalent organic frameworks", Science 361, 48-52 (2018). As a result, the density $\rho$ of the COF-300 single crystal was 0.735 [$g/cm^3$] and the unit cell volume was 5209.63 $Å^3$.

From the above results, it was found that the thermal conductivity $\lambda$ of the COF-300 single crystal was 0.116 $Wm^{-1}K^{-1}$. As compared with the literature value of the thermal conductivity of the COF-300 powder of 0.038 to 0.048 W/mK described above, the thermal conductivity $\lambda$ of the COF-300 single crystal is a value that is 2 times or more, and it has been confirmed that the idea that a higher thermal conductivity can be expressed by single crystallization is correct. From the measurement results of the COF single crystal, it is considered that the thermal conductivity can be further improved when pores inside the COF are eliminated by forming a composite material in which a heat-storage compound is included in the pores of the COF single crystal.

The invention claimed is:

1. A method for producing a covalent organic framework (COF) single crystal, the method comprising:
   a single crystal production step of reacting an aldehyde having a plurality of formyl groups in one or more aromatic rings and an amine having a plurality of amino groups in one or more aromatic rings via a solution containing an ionic liquid or an organic salt and an equilibrium adjusting agent in an aqueous solvent or a non-aqueous solvent to grow the COF single crystal at a temperature of 10° C. to 60° C. in about 1 to 30 days,
   wherein the equilibrium adjusting agent is an aldehyde having a single formyl group or an amine having a single amino group,
   wherein an amount of the equilibrium adjusting agent is 2 to 200 mol with respect to 1 mol of a total amount of the aldehyde having a plurality of formyl groups in one or more aromatic rings and the amine having a plurality of amino groups in one or more aromatic rings,
   wherein an amount of the ionic liquid or the organic salt is 0.1 to 10 mol with respect to 1 mol of a total amount of the aldehyde having a plurality of formyl groups in one or more aromatic rings and the amine having a plurality of amino groups in one or more aromatic rings,
   wherein a Lewis acidity of a cation of the ionic liquid or the organic salt is equal to that of methyltrioctylammonium, and a Lewis basicity of an anion of the ionic liquid or the organic salt is between or equal to that of chloride and that of bistrifluoromethanesulfonylimide, or wherein a Lewis acidity of a cation of the ionic liquid or the organic salt is between or equal to that of methyltrioctylammonium and that of tributylmethylphosphonium, and a Lewis basicity of an anion of the ionic liquid or the organic salt is between or equal to that of iodide and that of bistrifluoromethanelsulfonylimide.

2. The method for producing the COF single crystal according to claim 1, wherein the ionic liquid or the organic salt is one or more compounds selected from the group consisting of methyltrioctylammonium bistrifluoromethanesulfonylimide, methyltrioctylammonium chloride, methyltributylphosphonium bistrifluoromethanesulfonylimide, and methyltributylphosphonium iodide.

3. The method for producing the COF single crystal according to claim 1, wherein the ionic liquid or the organic salt is methyltrioctylammonium bistrifluoromethanesulfonylimide.

4. A method for producing a covalent organic framework (COF) single crystal, the method comprising:

preparing a solution (A) by dissolving a first raw material compound and an equilibrium adjusting agent in an aqueous solvent or a non-aqueous solvent, wherein the first raw material compound is an aldehyde having a plurality of formyl groups in one or more aromatic rings, and wherein the equilibrium adjusting agent is an aldehyde having a single formyl group or an amine having a single amino group;

preparing a solution (B) by dissolving a second raw material compound in an aqueous solvent or a non-aqueous solvent, wherein the second raw material compound is an amine having a plurality of amino groups in one or more aromatic rings;

preparing a solution (C) comprising an ionic liquid or an organic salt and an acid catalyst other than a cation of the ionic liquid or the organic salt;

mixing the solution (A) and the solution (C) to obtain a mixed solution; and performing a single crystal production step by adding the solution (B) to the mixed solution and reacting the first raw material, the second raw material, the ionic liquid or the organic salt, and the equilibrium adjusting agent to grow the COF single crystal at a temperature of 10° C. to 60° C. in about 1 to 30 days, wherein an amount of the equilibrium adjusting agent is 2 to 200 mole with respect to 1 mole of a total amount of the first raw material compound and the second raw material compound, wherein an amount of the ionic liquid or the organic salt is 0.1 to 10 mol with respect to 1 mol of a total amount of the aldehyde having a plurality of formyl groups in one or more aromatic rings and the amine having a plurality of amino groups in one or more aromatic rings, wherein a Lewis acidity of a cation of the ionic liquid or the organic salt is equal to that of methyltrioctylammonium, and a Lewis basicity of an anion of the ionic liquid or the organic salt is between or equal to that of chloride and that of bistrifluoromethanesulfonylimide, or wherein a Lewis acidity of a cation of the ionic liquid or the organic salt is between or equal to that of methyltrioctylammonium and that of tributylmethylphosphonium, and a Lewis basicity of an anion of the ionic liquid or the organic salt is between or equal to that of iodide and that of bistrifluoromethanesulfonylimide.

5. The method for producing the COF single crystal according to claim 4, wherein the ionic liquid or the organic salt is one or more compounds selected from the group consisting of methyltrioctylammonium bistrifluoromethanesulfonylimide, methyltrioctylammonium chloride, methyltributylphosphonium bistrifluoromethanesulfonylimide, and methyltributylphosphonium iodide.

6. The method for producing the COF single crystal according to claim 4, wherein the ionic liquid or the organic salt is methyltrioctylammonium bistrifluoromethanesulfonylimide.

7. The method for producing the COF single crystal according to claim 1, wherein the COF has a framework structure comprising:

(a) a linker selected from the group consisting of Formulas (I) to (VII)

I

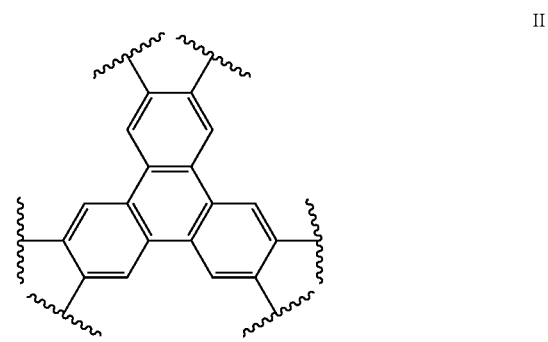

II

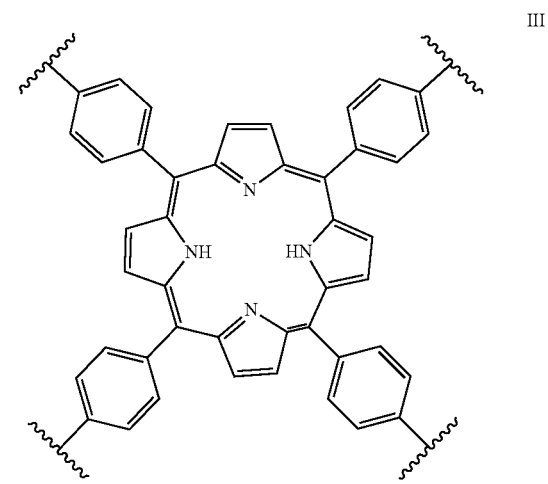

III

-continued

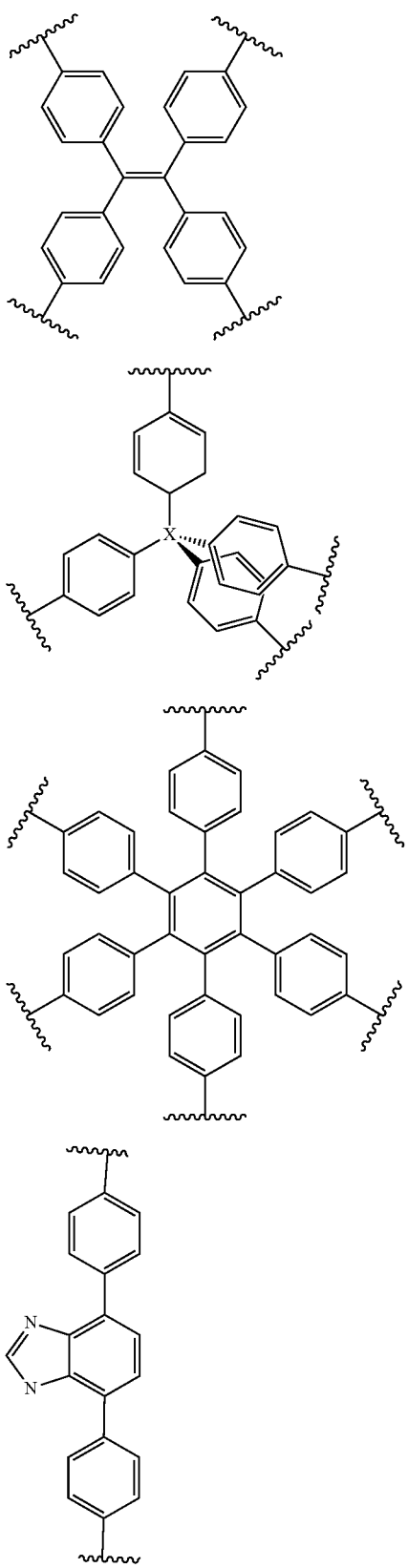

wherein X is a carbon atom or a silicon atom, and hydrogen bonded to aromatic rings of Formulas (I) to (VII), wherein the aromatic rings of Formula (I) to (VII) may be substituted with an alkyl group, an alkenyl group, an alkynyl group, an aryl group, an oxo group, a halogen atom, a hydroxy group, a nitro group, a sulfo group, an ether group, a thiol group, an ester group, a carbonate group, a carbonyl group, an amide group, an amino group, an azide group, a carbamate group, a cyano group, a hydroxy group, a carboxyl group, a sulfonic acid ester group, or a sultone group, and (b) a —C≡N— bond connecting the linkers to each other.

8. The method for producing the COF single crystal according to claim 1, wherein the COF is at least one selected from the group consisting of COF-300, COF-303, LZU-79, and LZU-111.

9. The method for producing the COF single crystal according to claim 4, wherein the COF has a framework structure comprising:

(a) a linker selected from the group consisting of Formulas (I) to (VII)

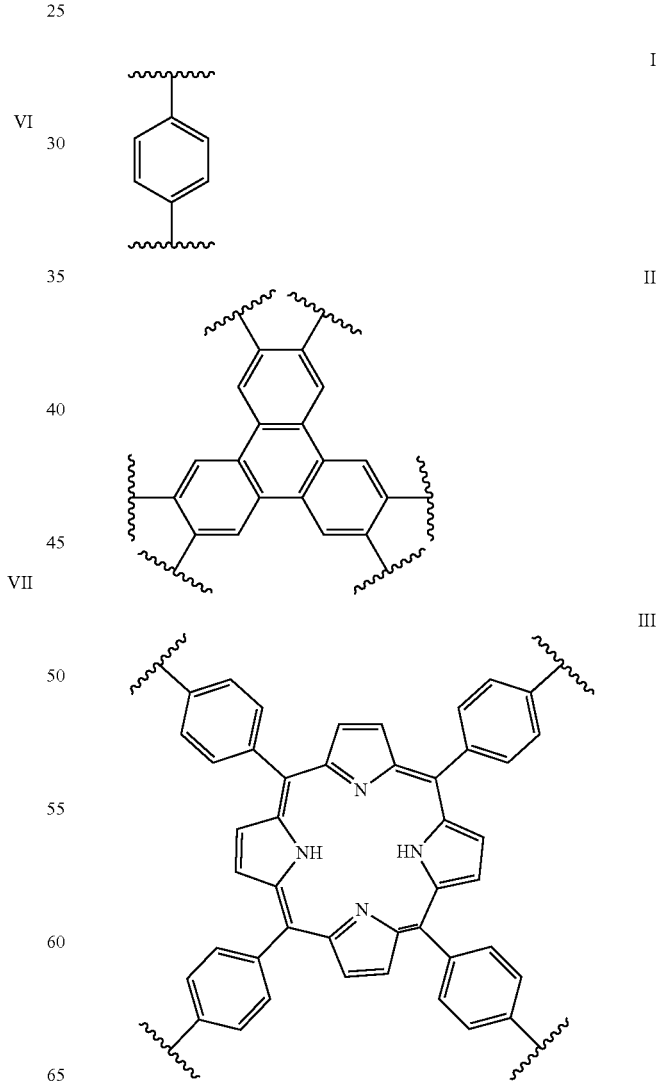

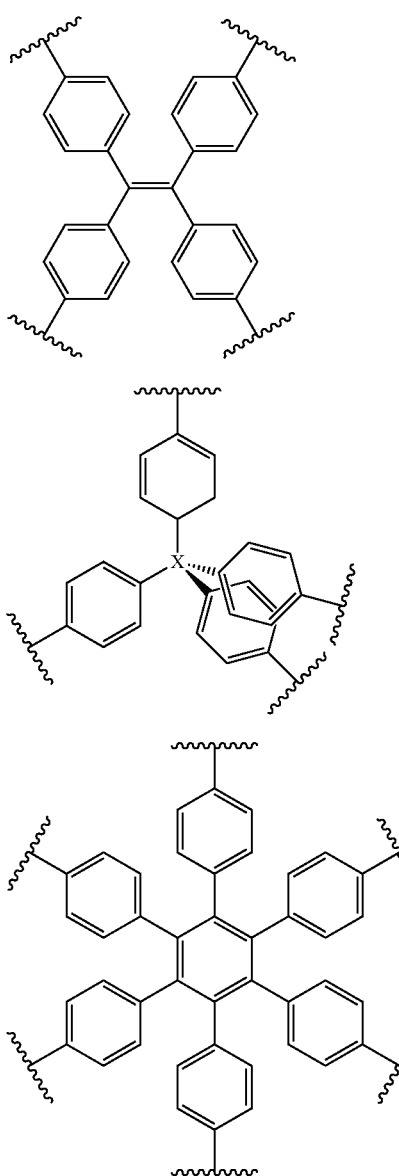

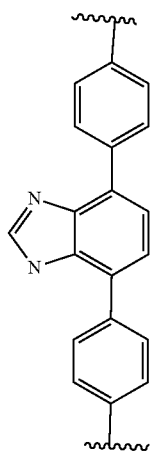

wherein X is a carbon atom or a silicon atom, and hydrogen bonded to aromatic rings of Formulas (I) to (VII), wherein the aromatic rings of Formulas (I) to (VII) may be substituted with an alkyl group, an alkenyl group, an alkynyl group, an aryl group, an oxo group, a halogen atom, a hydroxy group, a nitro group, a sulfo group, an ether group, a thiol group, an ester group, a carbonate group, a carbonyl group, an amide group, an amino group, an azide group, a carbamate group, a cyano group, a hydroxy group, a carboxyl group, a sulfonic acid ester group, or a sultone group, and (b) a —C=N— bond connecting the linkers to each other.

10. The method for producing the COF single crystal according to claim 4, wherein the COF single crystal is at least one selected from the group consisting of COF-300, COF-303, LZU-79, and LZU-111.

\* \* \* \* \*